(12) United States Patent
Timoney et al.

(10) Patent No.: US 7,779,974 B2
(45) Date of Patent: Aug. 24, 2010

(54) VEHICLE SUSPENSION SPRING SYSTEM

(75) Inventors: Sean Timoney, Dublin (IR); John Holland, Athboy (IR)

(73) Assignee: Technology Investments Limited, County Meath (IE)

( * ) Notice: Subject to any disclaimer, the term of this patent is extended or adjusted under 35 U.S.C. 154(b) by 946 days.

(21) Appl. No.: 11/506,846

(22) Filed: Aug. 21, 2006

(65) Prior Publication Data
US 2007/0039790 A1 Feb. 22, 2007

(30) Foreign Application Priority Data
Aug. 22, 2005 (IR) .............................. S2005/0555

(51) Int. Cl.
*F16F 9/00* (2006.01)
(52) U.S. Cl. ................... 188/318; 188/312; 188/313
(58) Field of Classification Search ................. 188/318, 188/312, 315, 298, 313; 280/5.515
See application file for complete search history.

(56) References Cited

U.S. PATENT DOCUMENTS

| | | | | |
|---|---|---|---|---|
| 3,871,635 A * | 3/1975 | Unruh et al. | ................. | 267/187 |
| 5,080,392 A * | 1/1992 | Bazergui | ................. | 188/266.4 |
| 6,886,837 B2 * | 5/2005 | Gibbs | ................. | 280/43.17 |
| 7,314,124 B2 * | 1/2008 | Martyn et al. | ................. | 188/318 |
| 2002/0121416 A1 * | 9/2002 | Katayama et al. | ........... | 188/314 |
| 2006/0181034 A1 * | 8/2006 | Wilde et al. | ............... | 280/5.515 |

* cited by examiner

*Primary Examiner*—Melanie Torres Williams
(74) *Attorney, Agent, or Firm*—Birch, Stewart, Kolasch & Birch, LLP

(57) ABSTRACT

A vehicle suspension spring system for a vehicle wheel station includes a hydraulic cylinder or strut having a piston which divides the cylinder volume into a main oil volume and an annular oil volume. The main oil volume communicates via a first oil passage with a first accumulator having a main gas volume. The annular oil volume communicates via a second oil passage with a second accumulator having an auxiliary gas volume. The oil in each accumulator is separated from the gas by a separator piston or diaphragm. A third oil passage with an isolating valve interconnects said first and second oil passages. Operation of the isolating valve is regulated by a controller. At least one sensor for sensing a parameter associated with vehicle attitude is connected to the controller. The controller is operable for switching the isolating valve between open and closed positions for altering spring stiffness of the strut in response to said sensed vehicle attitude parameter when the vehicle is in motion.

12 Claims, 4 Drawing Sheets

VEHICLE SUSPENSION SPRING SYSTEM

FIELD OF THE INVENTION

The present invention relates to vehicle suspension spring systems, and is intended as a mechanism to increase the roll resistance of a vehicle during cornering, without affecting the ride quality. The system is particularly applicable to independent suspension systems fitted with hydro-pneumatic suspension struts, although its application is not limited to independent suspensions.

BACKGROUND OF THE INVENTION

Ride and handling performance pose conflicting requirements on vehicle suspensions and thus designs are generally driven to achieve an acceptable compromise between the two, depending on the application. While a stiffer suspension is essential to enhance the rollover threshold value and control performance of the vehicle, a softer suspension yields good ride performance at the expense of poor stability and directional control.

In beam axle suspensions, because both wheels share the same axle, vertical movement of one wheel causes a similar movement in the other wheel. Both wheels respond as one unit, which detracts from the ride quality of the vehicle.

Independent suspension systems have a number of advantages over beam axle suspensions. The independent configuration removes cross talk between the wheels permitting one wheel to effectively track a positive obstacle while the other tracks a negative one. This factor combined with the lower un-sprung mass helps ensure that positive ground contact is maintained at all limes, with maximum isolation of the sprung mass from the road inputs.

Optimum ride quality is achieved for both types of suspension system by the use of soft springs and allowing large amounts of wheel travel. However, the handling characteristics of both types of suspension configuration suffer when soft springs are used because of excessive roll. The softer the suspension, the more the outer springs are compressed and the inner springs extended during a roll event. This rolling is due to weight transfer from the inside wheels to the outside wheels caused by the centripetal acceleration of the vehicle as it corners. This roll is accentuated by the displacement of the vehicle centre of gravity towards the outside wheels, an effect that is greatest in vehicles with high centres of gravity. Passive vehicle suspensions are thus often designed with auxiliary roll stiffness mechanisms such as anti-roll bars to attain an adequate compromise between ride, handling and control performance of the vehicle. Front-end "dive" under brake action is also more noticeable with soft springs.

The fact that axle cross talk is inherent to beam axles means that the introduction of an anti-roll bar has little detrimental effect on the ride quality and is seen to vastly improve the roll stiffness of the vehicle. The same however is not true for independent suspension systems. The key performance advantage for these is systems is the absence of axle cross talk and the complete independence of wheel movement over the full range travel. The introduction of any mechanical linkage across the axle restricts the independence of the system and introduces a cross-talk factor. This, while increasing the roll stability of the vehicle, produces a significant loss in ride quality, especially in challenging environments.

Vehicles fitted with pneumatic or hydro-pneumatic suspension systems offer the advantage of a variable spring rate, which can be manipulated to improve the roll stiffness of the vehicle. A number of systems have been proposed to improve the roll stiffness of vehicles by manipulating the pneumatic spring rate, all of which involve the cross linking of the spring elements on a given axle coupled with some means of oil transfer between them and/or external reservoirs of some description. See for example DE 4004204. Such systems again serve to detract from the independence of an independent suspension system, compromising on ride quality.

Japanese Patent Application Publication No. 62-286817 discloses a hydro-pneumatic suspension strut with a piston dividing a cylinder into a top chamber and a bottom chamber. Each chamber is connected through a damper with a separate accumulator. An external oil pump or accumulator connects to each chamber through in/out ports. This allows chamber pressure to be adjusted for attitude control. A normally closed shut valve connects between the chambers which, when opened, allows body height adjustment.

It is an object of the present invention to provide a vehicle suspension spring system that goes at least some way toward overcoming the above-mentioned problems and/or which will provide the public with a useful choice.

It is acknowledged that the term 'comprise' may, under varying jurisdictions be provided with either an exclusive or inclusive meaning. For the purpose of this specification, and unless otherwise noted explicitly, the term comprise shall have an inclusive meaning—i.e. that it may be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the ensuing description which is given by way of example only.

SUMMARY OF THE INVENTION

The present invention provides a vehicle suspension spring system which manipulates the spring rate of each individual hydro-pneumatic suspension spring system on a vehicle without the need for cross-linking and/or external oil reservoirs and the associated pumps.

According to the invention there is provided a vehicle suspension system in which each wheel station of the vehicle has a hydro-pneumatic spring system having an independently variable spring rate.

In a particularly preferred embodiment of the invention means is provided for sensing vehicle roll and for controlling spring stiffness at each wheel station in response to sensed vehicle roll.

In one embodiment there is provided a vehicle suspension spring system for a vehicle wheel station, including:
  a strut assembly having an hydraulic cylinder with a piston which divides the cylinder volume into a main oil volume and an annular oil volume,
  said main oil volume communicating via a first oil passage with an associated first accumulator having a main gas volume,
  said annular oil volume communicating via a second oil passage with an associated second accumulator having an auxiliary gas volume,
  the oil in each accumulator being separated from the gas by a separator piston or diaphragm,
  a third oil passage with an isolating valve which interconnects said first and second oil passages,
  means for switching the isolating valve between open and closed positions, characterised in that means is provided for sensing one or more vehicle attitude parameters, said sensing means being connected to a controller which is operable for switching the isolating valve between open and closed positions for altering spring stiffness in response to said sensed vehicle attitude parameter or parameters.

In another embodiment the sensing means includes one or more sensors for detecting lateral acceleration of the vehicle.

In another embodiment the sensing means includes means for sensing a vehicle's speed and steer angle, the controller having means for inferring vehicle lateral acceleration from said sensed speed and steer angle, the controller being operable to regulate operation of the isolating valve in response to the sensed vehicle speed and steer angle.

In a further embodiment the sensing means comprises one or more accelerometers or angular rate sensors on the vehicle connected to the controller which is operable to determine vehicle lateral acceleration from the sensor input to the controller.

In another embodiment the sensing means includes one or more sensors for detecting longitudinal acceleration of the vehicle.

In another embodiment the sensing means comprises a sensor in a brake system of the vehicle to detect operation of the brake system, the controller having means for inferring vehicle longitudinal acceleration from said sensed brake operation.

In another embodiment the sensing means includes one or more accelerometers or angular rate sensors on the vehicle connected to the controller which is operable to determine vehicle longitudinal acceleration from the sensor input to the controller.

In another embodiment at least one damping orifice is installed in one or more of the oil passages.

In another embodiment the means for opening and closing the isolating valve is electrically operated.

In another aspect the invention provides a vehicle suspension system comprising a plurality of the vehicle suspension spring systems as claimed in any preceding claim, each of said suspension spring systems having an independently variable spring rate.

In a further aspect the invention provides a vehicle attitude control system for a vehicle having a plurality of wheel stations including:

a strut assembly at each wheel station, each strut assembly having an hydraulic cylinder with a piston which divides the cylinder volume into a main oil volume and an annular oil volume, said main oil volume communicating via a first oil passage with an associated first accumulator having a main gas volume, said annular oil volume communicating via a second oil passage with an associated second accumulator having an auxiliary gas volume, the oil in each accumulator being separated from the gas by a separator piston or diaphragm, a third oil passage with an isolating valve which interconnects said first and second oil passages, means for switching the isolating valve between open and closed positions.

said struts being connected to a common controller and sensing means, the sensing means for sensing one or more vehicle attitude parameters.

said sensing means being connected to the controller which is operable for independently switching the isolating valve of each strut between open and closed positions for independently altering spring stiffness of each strut in response to said sensed vehicle attitude parameter or parameters.

In another embodiment the controller has means for inferring vehicle lateral acceleration from a sensed vehicle speed and steer angle and a solenoid actuated dual rate hydro-pneumatic suspension strut at each wheel station of the vehicle, the controller being operable to engage the required spring rate at each wheel station to counter body roll induced by the said lateral acceleration.

In another embodiment the controller has means for inferring vehicle longitudinal acceleration from a sensor in the vehicles braking system and a solenoid actuated dual rate hydro-pneumatic suspension strut at each wheel station of the vehicle, the controller being operable to engage the required spring rate at each wheel station to counter body pitch induced by the longitudinal acceleration.

In another embodiment the controller is operable for using sensed measurements from one or more accelerometers or angular rate sensors to actuate a solenoid actuated dual rate hydro-pneumatic suspension strut at each wheel station of the vehicle, the controller being operable to engage the required spring rate at each wheel station to counter body roll induced by lateral acceleration.

In another embodiment the controller is operable for using sensed measurements from one or more accelerometers or angular rate sensors to actuate a solenoid actuated dual rate hydro-pneumatic suspension strut at each wheel station of the vehicle, the controller being operable to engage the required spring rate at each wheel station to counter body pitch induced by longitudinal acceleration.

In another embodiment one or more damping orifice is installed in one or more of the said oil passages.

In a further embodiment the isolating valve has means such that it can be opened or dosed to provide a soft or hard spring stiffness characteristic. Preferably said means is electrically operated. Various other operating mechanisms for the isolating valve are also envisaged.

In one embodiment of the invention, operation of the vehicle on a side slope or subject to lateral or longitudinal acceleration is detected using one or more accelerometers. Alternatively or in combination with the accelerometers, vehicle roll and pitch motions can be sensed using angular rate sensors. Alternatively, vehicle lateral acceleration is inferred from measurements of vehicle speed and steering wheel angle and vehicle longitudinal acceleration is inferred from an input from the braking system.

Depending on the roll moment induced on the vehicle by the inferred lateral acceleration, the control system switches the required number of wheel stations to the higher spring rate.

Gentle lateral accelerations require only the switching of the unloaded wheel stations to the high rate to eliminate the jacking effect of these wheels travelling quickly into rebound. For more extreme manoeuvres such as double lane change emergency avoidance manoeuvres, the control system can immediately switch all wheel stations to the higher spring rate, minimising lateral displacement of the centre of gravity and thus minimising roll and providing maximum stability and handling performance.

Emergency braking manoeuvres are usually accompanied by severe pitching of the vehicle with the front end diving and the rear rising up leading to a loss of traction. The proposed system offers a means of controlling this by allowing the spring rates to be increased for the duration of the braking event.

BRIEF DESCRIPTION OF THE DRAWINGS

The invention will be more clearly understood by the following description of some embodiments thereof, given by way of example only, with reference to the accompanying drawings, in which.

DETAILED DESCRIPTION OF PREFERRED EMBODIMENTS

Figure 1:
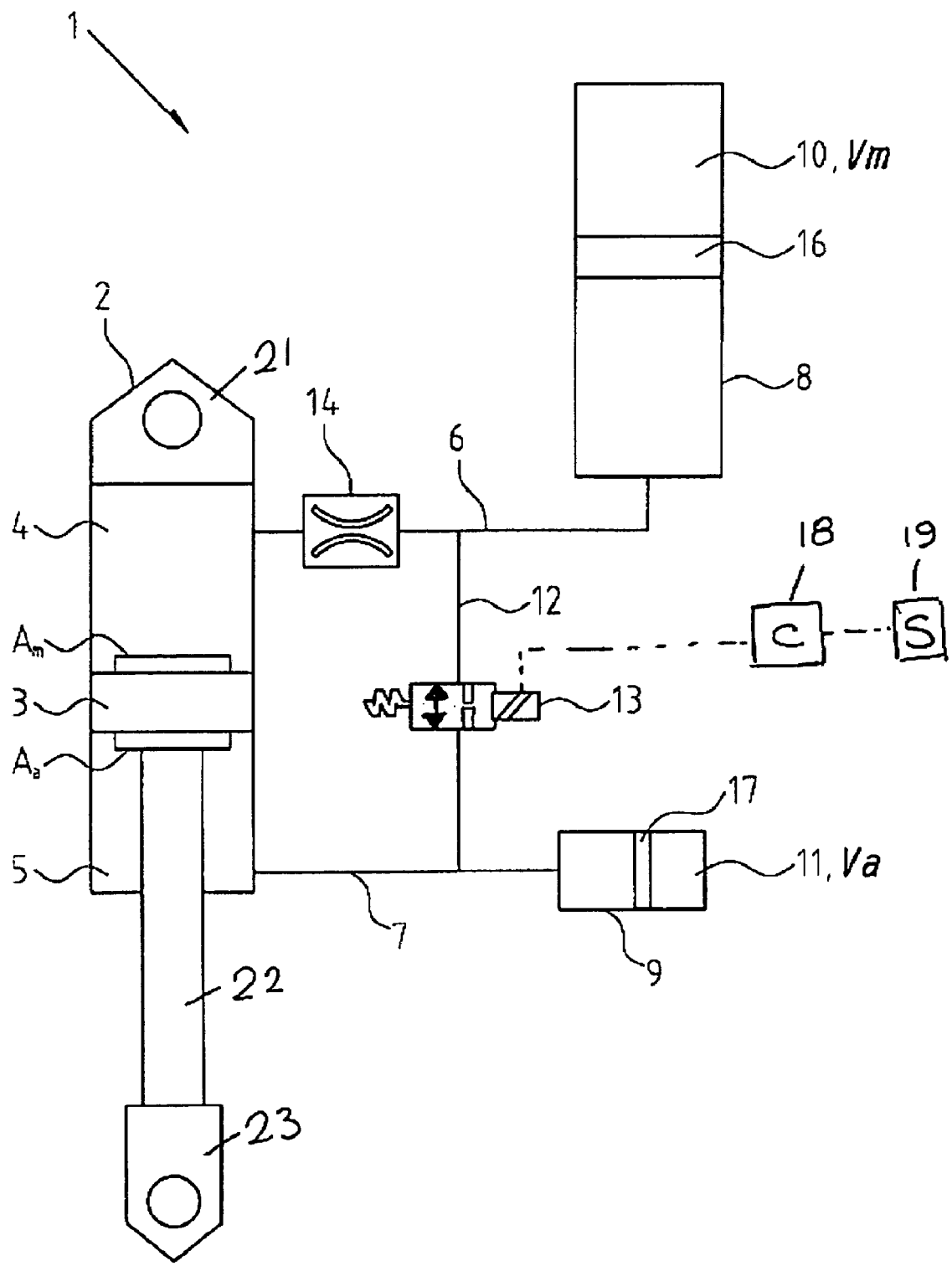
FIG. 1 is a diagrammatic illustration of a vehicle suspension spring system according to the invention.

The system, for the purposes of clarity, is represented diagrammatically in FIG. 1 as individual hydraulic components. It can be constructed as shown, but the preferred layout is one of an integrated strut utilizing internal volumes and valves, as opposed to externally linked components.

Referring to the drawings, there is illustrated a vehicle suspension spring system according to the invention indicated generally by the reference numeral 1. The suspension spring system 1 includes an hydraulic cylinder or strut 2 with piston 3 which has different areas $A_m$ and $A_a$ on each side. The piston 3 separates the hydraulic cylinder 2 into two volumes, the main oil volume 4 and the annular oil volume 5. Each volume 4 and 5 is connected hydraulically via oil lines or first and second oil passages 6 and 7 to accumulators 8 and 9 such that the oil pressures in volumes 4 and 5 act on a main gas volume 10 and an auxiliary gas volume 11 respectively. The oil in each accumulator 8, 9 is separated from the gas by a separator piston or diaphragm 16, 17. Oil passages 6 and 7 are interconnected by oil line or third oil passage 12 containing an isolating valve 13. Valve 13 is electrically actuated and may be arranged to be normally open or normally closed. For safety reasons it may be desirable that valve 13 be arranged to be normally closed. One or more damping orifices 14 are inserted as may be desirable in oil passages 6, 7 or 12.

The cylinder 2 has a mounting connector 21 at one end. A piston rod 22 extends outwardly from the piston 3 through the opposite end of the cylinder 2, with suitable sealing, and terminates in a mounting connector 23.

Operation of the valve 13 is regulated by a controller 18, at least one sensor 19 for sensing a parameter associated with vehicle attitude is connected to the controller 18. The controller 18 is operable for switching the isolating valve 13 between open and closed positions for altering spring stiffness in response to the sensed vehicle attitude parameter or parameters when the vehicle is in motion.

Figure 2:
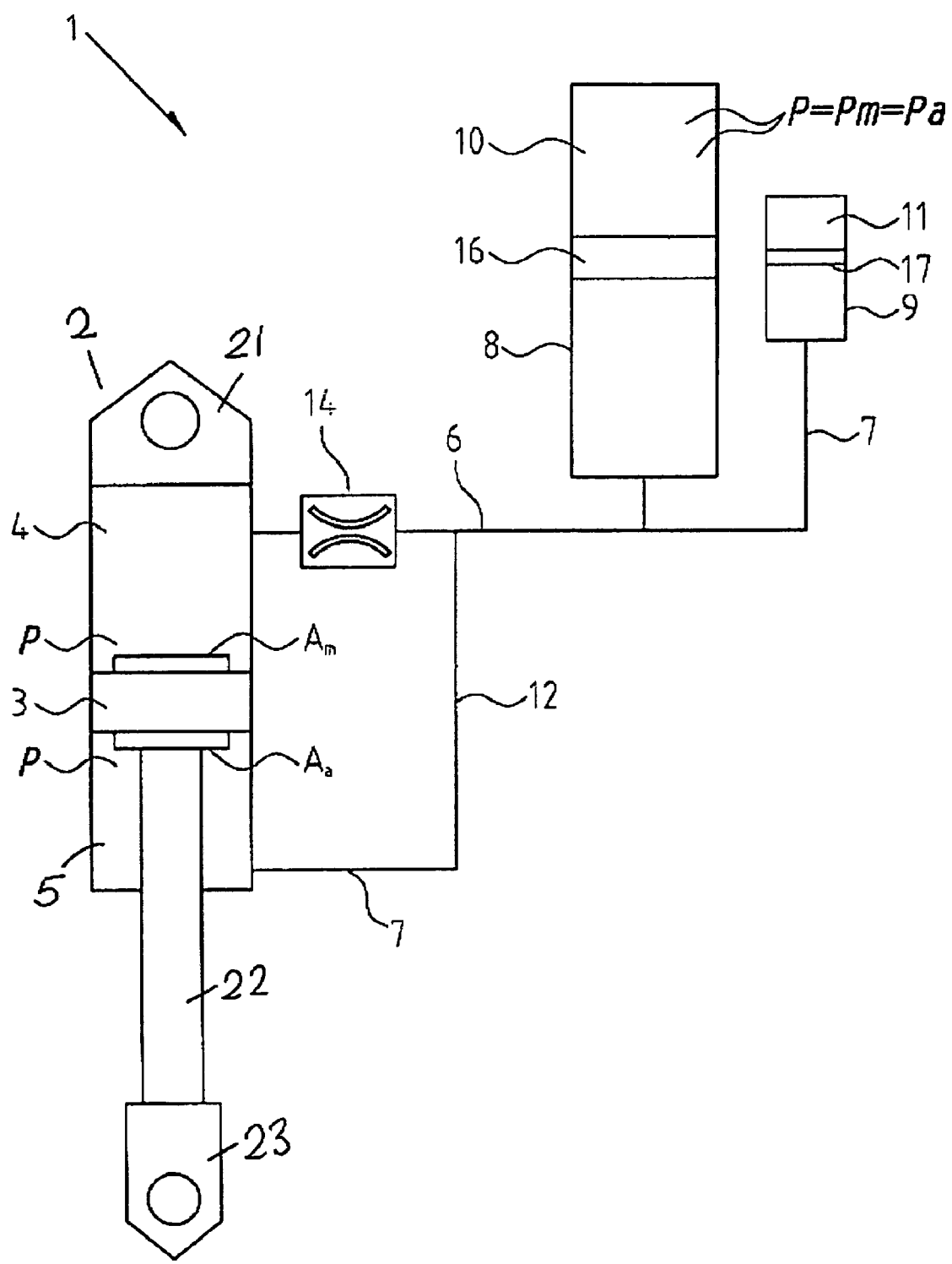
FIG. 2 is a diagrammatic illustration showing the vehicle suspension spring system in one position of use.

In the following description the pressure drop that occurs when oil flows through orifice 14 is ignored for clarity of explanation. With the isolating valve 13 in its open position the two gas volumes 10, 11 operate in tandem with each other, with $P_m$ the pressure of the main gas volume 10 being equal to $P_a$ the pressure of the auxiliary gas volume 11, as shown in FIG. 2 which schematically illustrates the effective position when the isolating valve 13 is open.

The net spring force exerted by the strut is equal to the pressure, P, in the main oil volume 4 acting on area $A_m$, which serves to extend the cylinder, less the pressure, P, in the annular oil volume acting on area $A_a$, which serves to contract the cylinder, or $P(A_m-A_a)$. As the strut is compressed, oil transfer compresses the gas thus increasing the pressure of the system. For a decrease in strut length x, a volume $(A_m-A_a)x$ of oil is transferred to the accumulators. The effective cylinder area is $(A_m-A_a)$. The effective gas volume, equal to the sum of the two smaller volumes 10 and 11, gives a soft spring rate producing a comfortable ride. This is the spring rate that is used when the vehicle is in straight-line motion on a level surface.

Figure 3:
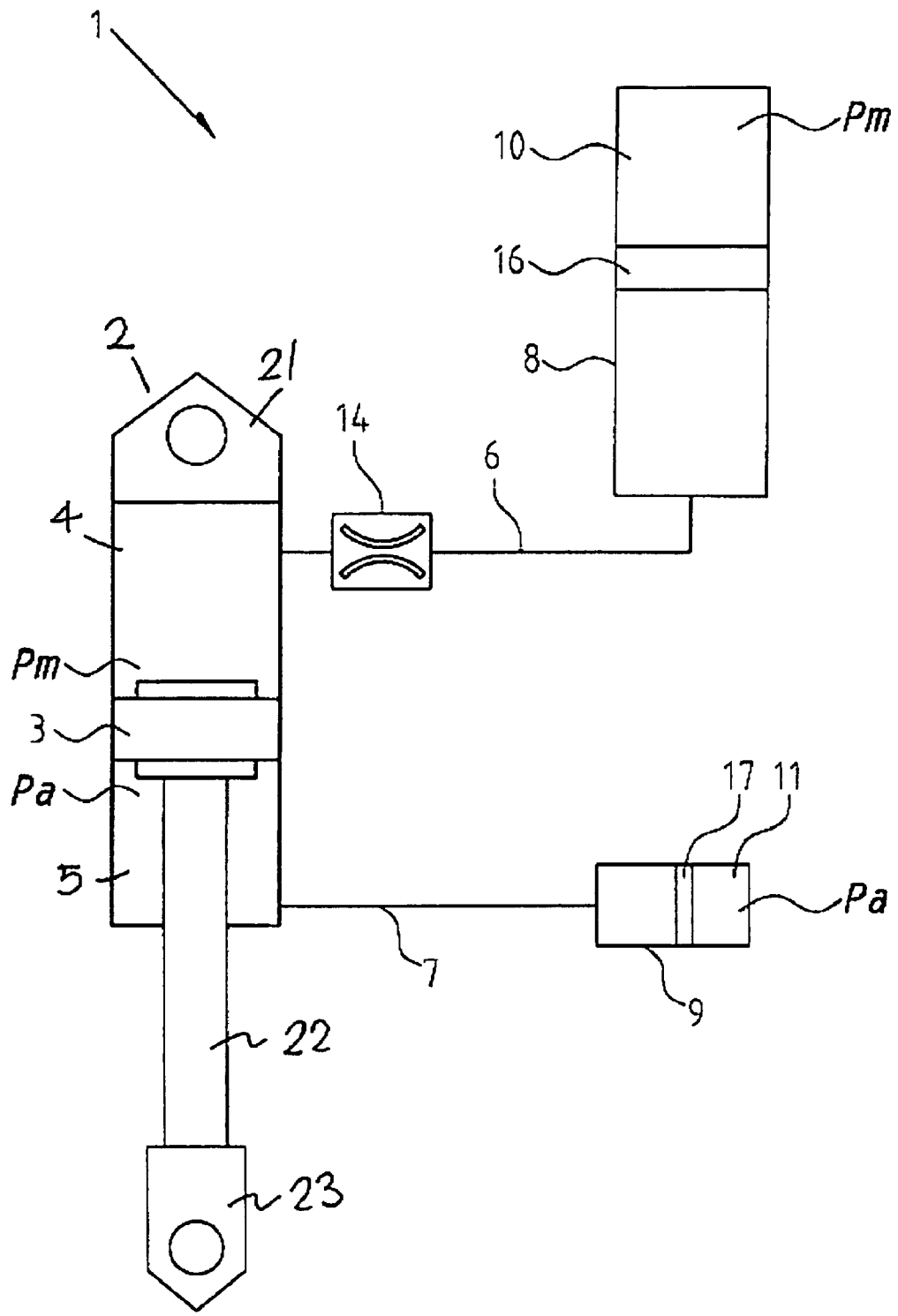
FIG. 3 is a diagrammatic illustration showing the vehicle suspension spring system in another position of use.

When the isolating valve 13 is closed, the pressure $P_m$ in the main gas volume 10 continues to operate on the main face of the cylinder piston 3 but the pressure $P_a$ of the auxiliary gas volume 11 operates on the annular face, as shown in FIG. 3 which schematically illustrates the effective position when the isolating valve 13 is closed.

In this configuration, for an increase in strut length x, $P_m$ decreases as the main gas volume 10 expands by $A_m x$; while $P_a$ increases as the auxiliary gas volume 11 is compressed by $A_a x$. The strut force is given by $P_m A_m - P_a A_a$. The pressure changes are governed approximately by the Ideal Gas Law and the rate of increase in $P_a$ is much greater than the rate of reduction in $P_m$. In a suspension this movement corresponds to the wheel travelling into rebound or being unloaded. The change in pressure differential across the cylinder piston 3 greatly stiffens the spring and resists the extension of the strut 2.

Conversely, as the cylinder 2 is compressed, $P_m$ increases as the gas in the main gas volume 10 is compressed; while $P_a$ decreases as the gas in the auxiliary gas volume 11 expands. Again, the pressure changes are governed approximately by the Ideal Gas Law and the rate of increase in $P_m$ is much greater than the rate of reduction in $P_a$. In a suspension this movement corresponds to the wheel travelling into bump or being loaded. The change in pressure differential across the cylinder piston 3 greatly stiffens the spring and resists the compression of the strut 2.

By closing the isolation valve 13, the spring rate of the suspension spring system 1 can be switched from soft to hard. It is envisaged that when the vehicle is travelling in a straight line on level ground, the suspension spring system at each individual wheel station would be set to soft by opening valve 13.

Operation of the isolation valve 13 is regulated by a controller 18 which is connected to one or more sensors 19 on the vehicle for sensing vehicle attitude parameters. In response to input from the sensor 19, the controller 18 opens or closes the isolating valve 13 appropriately to alter the spring stiffness of the strut 2 for optimum vehicle performance.

Figure 4:
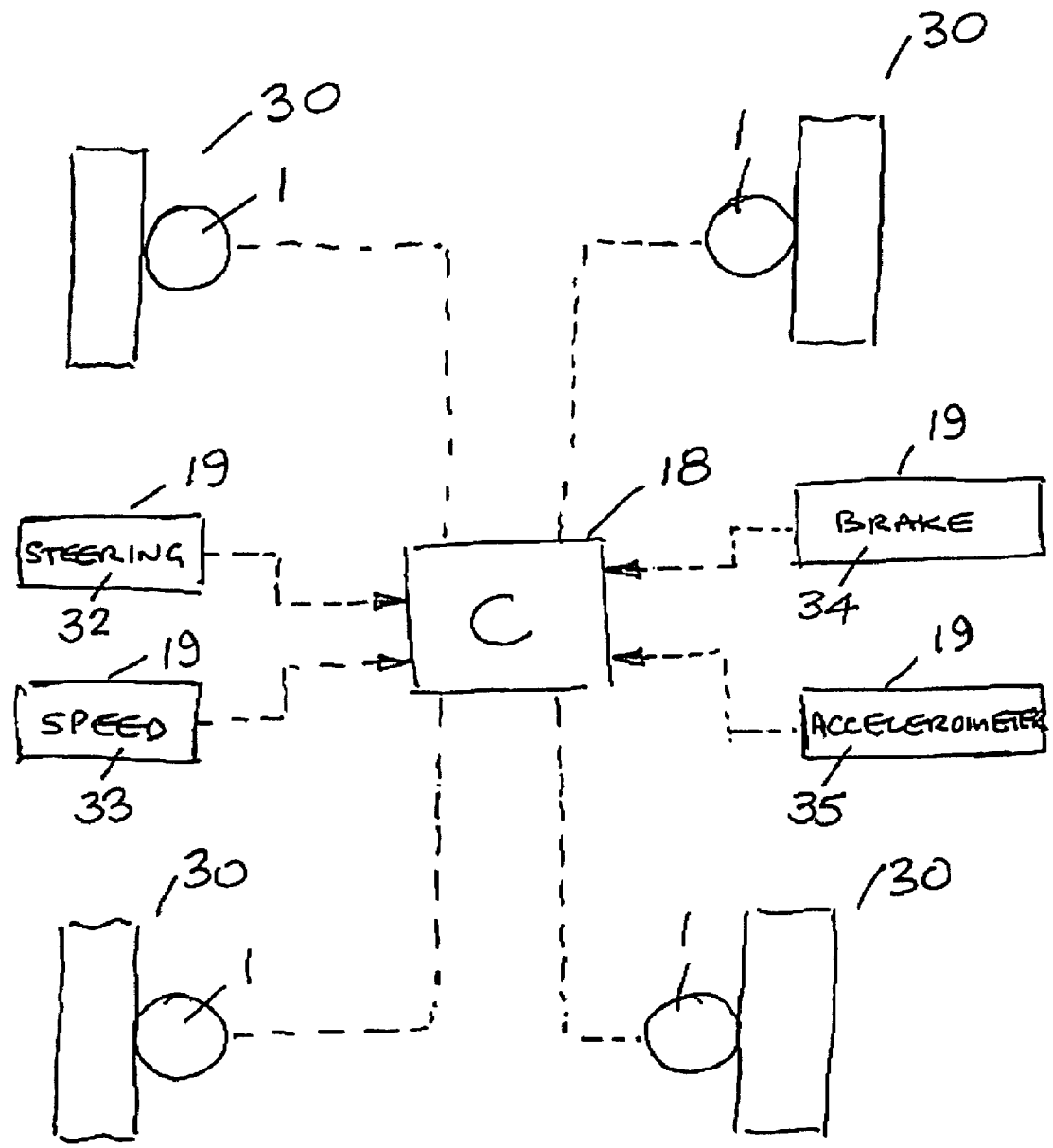
FIG. 4 is a schematic illustration of a vehicle attitude control system of the invention.

Referring now to FIG. 4, there is schematically shown a vehicle attitude control system incorporating a plurality of the strut assemblies described previously. Parts similar to those described previously are assigned the same reference numerals. A plurality of wheel stations 30 are shown with a strut assembly 1 at each wheel station 30. The strut assemblies 1 are all connected to a common controller 18 which receives input from one or more sensors 19 which may, for example, sense vehicle steer angle, speed, braking, for example, or accelerometers or angular rate sensors may be used to determine lateral and longitudinal acceleration of the vehicle. By way of example a vehicle steer angle sensor 32, a vehicle speed sensor 33, a vehicle brake sensor 34 and an accelerometer or angular rate sensor 35 are shown in FIG. 4. In response to input from the sensors 19, the controller 18 determines the lateral and/or longitudinal acceleration of the vehicle and independently adjusts each of the strut assemblies 1 at the wheel stations 30 to counter body pitch induced by the longitudinal acceleration and counter body roll induced by lateral acceleration.

While the isolating valve 13 has been described as being located between the first oil passage 6 and the second oil passage 7, various other equivalent arrangements may be provided for interconnecting the oil systems acting on opposite sides of the piston 3 of the strut 2. For example, the isolating valve 13 may be mounted between the main oil volume 4 and annular oil volume 5 of the cylinder or between the oil chambers of the accumulators 8, 9.

Aspects of the present invention have been described by way of example only and it should be appreciated that additions and/or modifications may be made thereto without departing from the scope thereof as defined in the appended claims.

The invention claimed is:

1. A vehicle suspension spring system for a vehicle wheel station, including:
   a strut assembly having an hydraulic cylinder with a piston which divides the cylinder volume into a main oil volume and an annular oil volume,
   said main oil volume communicating via a first oil passage with an associated first accumulator having a main gas volume,
   said annular oil volume communicating via a second oil passage with an associated second accumulator having an auxiliary gas volume,
   the oil in each accumulator being separated from the gas by a separator piston or a diaphragm,
   a third oil passage with an isolating valve which interconnects said first and second oil passages,
   means for switching the isolating valve between open and closed positions,
   sensing means for sensing one or more vehicle attitude parameters,
   said sensing means being connected to a controller which is operable for switching the isolating valve between open and closed positions for altering spring stiffness in response to said sensed vehicle attitude parameter or parameters,
   wherein the sensing means includes one or more sensors for detecting lateral acceleration of the vehicle, and
   wherein the sensing means includes means for sensing a speed and a steer angle of the vehicle,
   the controller including means for inferring a lateral acceleration of the vehicle from said sensed speed and steer angle, and the controller being operable to regulate operation of the isolating valve in response to the sensed vehicle speed and the steer angle.

2. A vehicle suspension spring system as claimed in claim 1, wherein the sensing means comprises one or more accelerometers or angular rate sensors on the vehicle connected to the controller which is operable to determine a lateral acceleration of the vehicle from the sensor input to the controller.

3. A vehicle suspension spring system as claimed in claim 1, wherein the sensing means includes one or more sensors for detecting a longitudinal acceleration of the vehicle.

4. A vehicle suspension spring system as claimed in claim 3, wherein the sensing means comprises a sensor in a brake system of the vehicle to detect operation of the brake system, the controller having means for inferring the longitudinal acceleration of the vehicle from said sensed brake operation.

5. A vehicle suspension spring system as claimed in claim 3, wherein the sensing means includes one or more accelerometers or angular rate sensors on the vehicle connected to the controller which is operable to determine the longitudinal acceleration of the vehicle from the sensor input to the controller.

6. A vehicle suspension spring system as claimed in claim 1, in which at least one damping orifice is installed in one or more of the oil passages.

7. A vehicle suspension spring system as claimed in claim 1, in which the means for opening and closing the isolating valve is electrically operated.

8. A vehicle suspension system comprising a plurality of the vehicle suspension spring systems as claimed in claim 1, each of said suspension spring systems having an independently variable spring rate.

9. A vehicle attitude control system for a vehicle having a plurality of wheel stations including:
   a strut assembly at each wheel station,
   each strut assembly having an hydraulic cylinder with a piston which divides the cylinder volume into a main oil volume and an annular oil volume,
   said main oil volume communicating via a first oil passage with an associated first accumulator having a main gas volume,
   said annular oil volume communicating via a second oil passage with an associated second accumulator having an auxiliary gas volume,
   the oil in each accumulator being separated from the gas by a separator piston or diaphragm,
   a third oil passage with an isolating valve which interconnects said first and second oil passages,
   means for switching the isolating valve between open and closed positions,
   said struts being connected to a common controller and sensing means,
   the sensing means for sensing one or more vehicle attitude parameters,
   said sensing means being connected to the controller which is operable for independently switching the isolating valve of each strut between open and closed positions for independently altering spring stiffness of each strut in response lo said sensed vehicle attitude parameter or parameters,
   wherein the controller includes means for inferring a lateral acceleration of the vehicle from a sensed vehicle speed and steer angle and a solenoid actuated dual rate hydro-pneumatic suspension strut at each wheel station of the vehicle,
   the controller being operable to engage a required spring rate at each wheel station to counter body roll induced by the said lateral acceleration.

10. A vehicle attitude control system as claimed in claim 9, wherein the controller has means for inferring a longitudinal acceleration of the vehicle from a sensor in a braking system of the vehicle and a solenoid actuated dual rate hydro-pneumatic suspension strut at each wheel station of the vehicle,
    the controller being operable to engage the required spring rate at each wheel station to counter body pitch induced by the longitudinal acceleration.

11. A vehicle attitude control system as claimed in claim 9, wherein the controller is operable for using sensed measurements from one or more accelerometers or angular rate sensors to actuate a solenoid actuated dual rate hydro-pneumatic suspension strut at each wheel station of the vehicle,
    the controller being operable to engage the required spring rate at each wheel station to counter body roll induced by the lateral acceleration.

12. A vehicle attitude control system as claimed in claims 9, wherein the controller is operable for using sensed measurements from one or more accelerometers or angular rate sensors to actuate a solenoid actuated dual rate hydro-pneumatic suspension strut at each wheel station of the vehicle,
    the controller being operable to engage the required spring rate at each wheel station to counter body pitch induced by the longitudinal acceleration.

* * * * *